United States Patent
Engel

(10) Patent No.: US 12,380,672 B2
(45) Date of Patent: Aug. 5, 2025

(54) METHOD AND SYSTEM OR DEVICE FOR RECOGNIZING AN OBJECT IN AN ELECTRONIC IMAGE

(71) Applicant: Vision Components Gesellschaft Fuer Bildverarbeitungssysteme mbH, Ettlingen (DE)

(72) Inventor: Michael Engel, Karlsruhe (DE)

(73) Assignee: Vision Components Gesellschaft Fuer Bildverarbeitungssystems MBH, Ettlingen (DE)

( * ) Notice: Subject to any disclaimer, the term of this patent is extended or adjusted under 35 U.S.C. 154(b) by 378 days.

(21) Appl. No.: 18/099,834

(22) Filed: Jan. 20, 2023

(65) Prior Publication Data

US 2023/0154144 A1    May 18, 2023

Related U.S. Application Data

(63) Continuation of application No. PCT/EP2021/070133, filed on Jul. 19, 2021.

(30) Foreign Application Priority Data

Jul. 21, 2020 (DE) ............... 10 2020 119 243.6

(51) Int. Cl.
*G06V 10/00* (2022.01)
*G06V 10/26* (2022.01)
(Continued)

(52) U.S. Cl.
CPC ............ *G06V 10/753* (2022.01); *G06V 10/26* (2022.01); *G06V 10/764* (2022.01); *G06V 10/774* (2022.01)

(58) Field of Classification Search
CPC .... G06V 10/82; G06V 10/753; G06V 10/754; G06V 10/26; G06V 10/774;
(Continued)

(56) References Cited

U.S. PATENT DOCUMENTS 8,768,313 B2 * 7/2014 Rodriguez ......... H04N 1/00331
455/414.1
9,390,346 B1 * 7/2016 Sheets, Jr. .............. G06V 20/66
(Continued)

FOREIGN PATENT DOCUMENTS

| EP | 3118812 A1 | 1/2017 |
|----|------------|--------|
| EP | 3258442 A1 | 12/2017 |

OTHER PUBLICATIONS

Szeliski, Richard "Computer Vision: Algorithms and Applications" Sep. 3, 2010, retrieved from internet: https://szeliski.org/Book/drafts/ SzeliskiBook_20100903_draft.pdfchapter_1.1, pp. 5-6 chapter 2.2 chapter 2.3.
(Continued)

*Primary Examiner* — Amir Alavi
(74) *Attorney, Agent, or Firm* — Muncy, Geissler, Olds & Lowe, P.C.

(57) ABSTRACT

A method is provided for machine vision and image analysis for recognizing an object in an electronic image, which is captured with the aid of an optical sensor. A reference image of the object to be recognized is trained during a learning phase and compared with the image of the scene during a working phase, the pattern comparison between the object and the scene takes place with the aid of a modified census transform, using a determination of maximum and which must exceed a threshold value for a positive statement on a degree of correspondence.

21 Claims, 7 Drawing Sheets

(51) Int. Cl.
*G06V 10/75* (2022.01)
*G06V 10/764* (2022.01)
*G06V 10/774* (2022.01)

(58) Field of Classification Search
CPC ...... G06V 10/764; G06V 20/10; G06N 20/00;
G06N 20/10; G06F 18/22
See application file for complete search history.

(56) References Cited

U.S. PATENT DOCUMENTS

| | | | |
|---|---|---|---|
| 9,465,521 B1* | 10/2016 | Giordano | G06F 16/907 |
| 9,497,393 B2* | 11/2016 | Reed | H05B 47/125 |
| 10,179,597 B2* | 1/2019 | Wade | B61L 27/70 |
| 10,311,564 B2 | 6/2019 | Konishi | |
| 10,402,704 B1* | 9/2019 | Wu | G06V 20/62 |
| 10,424,058 B2 | 9/2019 | Sagisaka | |
| 11,812,169 B2* | 11/2023 | Brändli | H04N 25/771 |
| 11,825,218 B2* | 11/2023 | Berner | H04N 25/47 |
| 11,825,229 B2* | 11/2023 | Brändli | H04N 25/79 |
| 12,188,957 B2* | 1/2025 | Kambhampati | H04N 23/695 |
| 2015/0003736 A1 | 1/2015 | Choi et al. | |
| 2015/0169638 A1 | 6/2015 | Jaber et al. | |
| 2018/0197274 A1* | 7/2018 | Price | G06T 7/55 |
| 2023/0154144 A1* | 5/2023 | Engel | G06V 10/774 |
| | | | 382/159 |

OTHER PUBLICATIONS

Davies, E. R. „Chapter 1, Vision, the challenge *Computer-Vision: Principles, Algorithms, Applications, Learning, Elsevier Science & Technology,* 2017. ProQuest Ebook Central, pp. 1-16.
Wikipedia, edited by Graeme Bartlett: "Census transform" Oct. 24, 2019. Retrieved from https://en.wikipedia.org/w/index.php?title=Cencus_transform&oldid=922798675.
Froeba, Bernhard et al: "Face Detection with the Modified Cencus Transform" *Proceedings of the 6$^{th}$ IEEE International Conference on Automatic Face and Gesture Recognition,* 2004.
Sperker, Hans-Christian et al: "Feature-based Object Recognition—a case study for car model detection" *11$^{th}$ International Workshop on Content-based Multimedia Indexing,* Jun. 17-19, 2013, pp. 127-130.
Ahlberg, Carl et al: "The genetic algorith census transform: evaluation of census window of different size and level of sparseness through hardware in-the-loop training" Published online Jul. 6, 2020, *Journal of Real-Time Image Processing (2021),* pp. 539-559.
International Search Report dated Nov. 2, 2021 in corresponding application PCT/EP2021/070133.

* cited by examiner $$F = \begin{bmatrix} 1 & 2 & 3 \\ 8 & C & 4 \\ 7 & 6 & 5 \end{bmatrix}$$

Fig. 2

$$F = \begin{bmatrix} I_1 & I_2 & I_3 \\ I_8 & I_0 & I_4 \\ I_7 & I_6 & I_5 \end{bmatrix}$$

Fig. 3

$$F = \begin{bmatrix} I_1 & I_3 & I_7 \\ & I_6 & I_0 \\ I_2 & & \\ & I_{10} & I_5 \\ & I_8 & \\ I_9 & I_4 & \end{bmatrix}$$

METHOD AND SYSTEM OR DEVICE FOR RECOGNIZING AN OBJECT IN AN ELECTRONIC IMAGE

This nonprovisional application is a continuation of International Application No. PCT/EP2021/070133, which was filed on Jul. 19, 2021, and which claims priority to German Patent Application No. 10 2020 119 243.6, which was filed in Germany on Jul. 21, 2020, and which are both herein incorporated by reference.

BACKGROUND OF THE INVENTION

Field of the Invention

The present invention relates to a method and a system or an apparatus for machine vision and image analysis for recognizing an object in an electronic image. It also relates to the field of pattern recognition, in which regularities, repetitions, similarities, or legitimacies must generally be recognized in a quantity of data. Typical examples of the applications of a pattern recognition are voice recognition, text recognition, and face recognition. Pattern recognition is also of central importance to more general fields, such as artificial intelligence or data mining.

Description of the Background Art

A pattern recognition process may be broken down into multiple sub-steps, in which the recognition takes place at the beginning and an ascertained classification occurs at the end. During the recognition, data or signals are captured and digitized with the aid of sensors, for example a digital image of a scene is captured with the aid of a digital camera. Patterns are obtained from the usually analog signals, which may be represented mathematically in vectors, so-called feature vectors, and matrices. A preprocessing of the signals takes place to reduce data and improve the quality. While obtaining the features, the patterns are subsequently transformed into a feature space by extracting features. The dimension of the feature space, in which the patterns are now represented as dots, is limited to the key features during the feature reduction. The final core step is classification by a classifier, which assigns the features to different classes. The classification method may be based on a learning procedure with the aid of a sampling.

A preprocessing generally takes place to be able to better recognize patterns in the captured signals or data. Removing or reducing unwanted or irrelevant signal components does not result in a reduction of the data to be processed, which only takes place while obtaining the features. Possible preprocessing methods are, among others, signal averaging, applying a threshold value, and normalizing. Desired results of preprocessing are reducing noise and mapping to a standard value range.

After the pattern is improved through preprocessing, different features may be obtained from its signal. This is generally done empirically according to methods obtained by intuition and experience, since few purely analytic methods exist (such as automatic feature synthesis). The features that are essential depend on the particular application. Features may be made up of symbols or symbol chains or be obtained from different scale levels using statistical methods. Among the numeric methods, a distinction is made between methods in the original range and methods in the spectral range. Possible features are, for example, characteristic values of the distribution function, aspects such as expected value and variance, correlation, and convolution.

The original signal values may be placed into a more manageable feature space with the aid of transforms such as the discrete Fourier transform (DFT) and the discrete cosine transform (DCT). The boundaries between methods for obtaining features and for reducing features are fluid. Since it is desirable to obtain as few features as possible, which are therefore all the more meaningful, relationships such as the covariance and the correlation coefficient between multiple features may be taken into account. Features may be decorrelated with the aid of the Karhunen-Loève transform (principal axis transform).

To reduce the features to the ones essential for the classification, a check is made of which features are relevant for the class separation and which may be omitted. Feature reduction methods are variance analysis, in which a check is made of whether one or multiple features are able to be separated, and discriminant analysis, in which the smallest possible number of separable non-elementary features are formed by combining elementary features.

The final and essential pattern recognition step is the classification of features in classes. Different classification methods exist for this purpose.

The invention is directed to a sub-area of pattern recognition and digital image processing, namely to image analysis. In image analysis, an attempt is made to extract a useful piece of information from a digital image by means of automatic image processing techniques, for example with the aid of a computer, an electrical circuit, a digital camera, or a mobile phone. For example, two-dimensional images are recognized during machine vision and three-dimensional images in medicine. The applied image processing techniques include, among others, recognizing two- and three-dimensional objects (object recognition) and segmentation.

Segmentation is a sub-area of digital image processing and machine vision. Generating content-related regions by combining adjacent pixels (in a two-dimensional image) or voxels (in a three-dimensional grid) according to a certain homogeneity criterion is referred to as segmentation. Objects are segmented in an image. A symbolic description is assigned thereto. Segmentation is a machine vision process, usually the first step in image analysis, whose sequence is as follows: scene, image capture, image preprocessing, segmentation, feature extraction, classification, statement.

Many automatic segmentation methods are known. In principle, they are often divided into pixel-, edge-, and region-oriented methods. A distinction is also made between model-based methods, in which a certain shape of the objects is assumed, and texture-based methods, in which an inner homogeneous structure of the objects is also taken into account. The boundaries between the methods are often fluid. Different methods may also be combined to achieve better results.

One speaks of segmentation if individual objects may be counted in a binarized image. Each segmented object is then described, for example, by a run-length encoding of the binarized pixels. The binarization is the preliminary stage of a segmentation. The most widely used binarization method is certainly the threshold value method. This method is based on a threshold value, which is best determined via a histogram. One problem with many segmentation algorithms is their susceptibility to changing illumination within the image. This may result in the fact that only one part of the image is always segmented correctly, while the segmentation in the other parts of the image is unusable.

The invention relates to the field of machine vision or image analysis. These terms generally describe the computer-supported approach of tasks oriented toward the capabilities of the human visual system. Typical machine vision tasks are object recognition and measuring the geometric structure of objects (externally induced motion, egomotion). Image processing algorithms are used, such as segmentation, as are pattern recognition methods, for example for the purpose of classifying objects. For the sake of simplicity, object recognition is also referred to as pattern recognition.

Machine vision systems and apparatuses are used primarily in industrial manufacturing processes in the areas of automation technology and quality assurance. Other applications include, for example, traffic engineering, from simple radar traps to "seeing vehicles," and in security technology (access control, automatic recognition of dangerous situations). For example, the following tasks are performed: Product control by automatic optical inspection, defect recognition beneath surfaces, shape and dimension checks, position recognition, surface inspection, object recognition, layer thickness measurements, completeness checks.

Image analysis techniques are used in industrial environments. Computers support, for example, quality control and measure simple objects. The advantages may be a higher level of quality, analysis of disturbance variables and process improvement, fewer rejects, securing the supply chain, monitoring highly dynamic production processes, and a cost optimization. In the prior art, the extensive compliance with predefined ambient conditions (camera position, lighting, speed of the production line, position of the objects, etc.) is important for the algorithms to run without errors.

Examples for using machine vision in industrial environments, production facilities, and applications are:

Shims on a conveyor belt are monitored to check dimensional stability and to reduce the error quota of the end product by multiple powers of ten.

Welding robots are steered to the right welding position.

Automatic optical quality control of workpieces (for example, is the bore hole in the right place?)

Sorting and error recognition of parts and workpieces, for example of bulk material, circuit boards, photographic prints.

Operations often exist in factory automation, in which parts must be sorted or defective parts separated from good ones. For example, when feeding parts with the aid of a vibrating conveyor, it is often necessary to detect one or multiple rotational positions to remove parts in an unsuitable rotational position prior to processing.

There are other similar tasks, such as when recognizing patterns on labels, for example to count labels, to check the correctness of the writing, or to draw conclusions about the cut edge between two labels where the latter may be cut apart.

A further task is the recognition of fiducial markers, for example on circuit boards or integrated circuits. Electronic components and fiducial markers are measured to achieve the most accurate possible fitting. In integrated circuits, only one uniquely identifiable pattern on the chip is often used for image registration (position determination).

For tasks of this type, electronic sensors which include an integrated image processing function are used more and more as the imaging sensor system. As a rule, a two-dimensional image of the scene is captured with the aid of image processing sensors of this type. It is desirable if the recognition could have already taken place on parts of the complete pattern because, in practice, the parts may often be partially covered.

A first known object recognition method is based on a contour-based pattern recognition of objects in an image with the aid of the "VISOR® Object" sensor from SensoPart Industriesensorik GmbH, which includes canny edge detection and the generalized Hough transform. The advantage of this method is its high-resolution, precise part location and position determination (position and rotational position) largely independently of the rotational position and scaling of the object. However, its disadvantages are that it requires high equipment complexity and computational demand and is therefore cost-intensive and slow.

Another known object recognition method is based on a pattern comparison with the aid of the normalized cross-correlation (NCC), in which a pixel-to-pixel comparison must be carried out for each pattern (scalar product of the grayscale values of the image and pattern). This method is used, for example, in die and wafer bonders and circuit board insertion machines. It has the advantages that it is a standard that has been used for decades and performs well for non-rotated and non-scaled patterns (objects). However, its disadvantages are that it also requires high equipment complexity and computational demand and is therefore cost-intensive and slow.

The known methods, systems, and apparatuses generally require a high equipment complexity and computational demand and are thus cost-intensive and slow. In EP 3 118 812 A1, which corresponds to US 2017/0024869, a sensor having a background comparison is therefore proposed, in which an image reduction, smoothing, gradient calculation, and a two-stage search method are used for image processing. An image processing sensor having an integrated image processing function is also described in EP 3 258 442 A1, which corresponds to US 2017/0358070, in which objects are recognized by comparison with a background image. The approaches proposed there have the advantage that they may be implemented cost-effectively and operate very fast. However, the disadvantage is that a constant background is necessary for the object recognition, which limits the practical usability.

A method for extracting 3D data is known from US 2015/0003736 A1. This publication relates to a method for evaluating stereo images. In methods of this type, two images of a scene are captured from different positions. The two images are typically first epipolar-corrected (rectified) and then the images of the two cameras may be matched by comparing them row-by-row with the aid of a correlation method. A pattern in the one image is thus selected and a similar one in the other image is sought. For example, a census transform may be used in the correlation method, cf. e.g., C. Ahlberg et al., *The genetic algorithm census transform: evaluation of census windows of different size and level of sparseness through hardware in-the-loop training*, Journal of Real-Time Image Processing (2021) 18:539-559, published online on Jul. 6, 2020.

In US 2015/0003736 A1, this is the pattern used for matching the two stereo images, not part of the one object captured in the scene; instead, a predefined, simple pattern is used for this purpose, for example a bright spot having a two-dimensional Gaussian intensity distribution, which is projected onto the scene during the capture, for example with the aid of a laser. During the evaluation of the stereo images, the positions of the dots of this projected pattern are determined in the images. The projected pattern is transformed with the aid of the modified census transform and stored. The two stereo images are also transformed by a modified census transform, and the transformed images are compared with the transformed patterns to localize the latter therein. Since the projected pattern is relatively small or simple, small windows of 3×3, 5×5, or 7×7 pixels in size are sufficient for the comparison. The known method is carried out iteratively to successively locate the dots of the projected pattern in different enlargement stages of the images.

With the aid of the method known from US 2015/0003736 A1, it is possible to determine the position of a pattern projected into a scene in captured stereo images of the scene; however, it is not possible to carry out an object recognition in an image, i.e., to check an electronic image of a scene by machine vision and image analysis to see whether an object to be recognized is or is not present in the scene. With the aid of the known method, it is not possible to predefine which object in a scene unchanged by the method is to be sought, but rather only the position of a pattern may be determined, of which it is known that the pattern is present in the captured scene because it is additionally projected into the scene.

SUMMARY OF THE INVENTION

It is therefore an object of the present invention to provide a method and a system or an apparatus for machine vision and image analysis for recognizing an object in an electronic image, with the aid of which an object in an image of a scene may be recognized with little equipment complexity and computational demand and therefore cost-effectively and quickly. A pattern may also be recognized instead of an object. In the discussion below, the terms object and pattern and object recognition and pattern recognition are treated as having the same meaning.

This object is achieved according to an exemplary embodiment of the invention by a method for machine vision and image analysis for recognizing an object in an electronic image, in which a scene is captured with the aid of an optical sensor and an electronic image of the scene is generated, and the electronic image of the scene is checked for the presence of the object with the aid of a correlation method, in that the electronic image of the scene is compared with a reference image using the correlation method, comprises a learning phase, in which a reference image of the object to be recognized is transformed with the aid of a modified census transform and is binarized, in that pixels of the transformed reference image are compared with the mean value of the transformed reference image formed from these pixels, and the value of a pixel is set to 1 if it is greater than the mean value and is set to 0 if it is less than the mean value; and the result of this transformation is stored in a transformed, binarized reference vector; and comprises a working phase, in which an image of a scene is captured with the aid of an optical sensor, which is to be checked for the presence of the object to be recognized; the image of the scene or image sections of the image is/are transformed with the aid of a modified census transform and is/are binarized, in that pixels of the transformed image or image sections are compared with the mean value of the transformed image or image sections formed from these pixels, the value of a pixel being set to 1 if it is greater than the mean value and being set to 0 if it is less than the mean value; and the results of this scene transformation are compared as transformed, binarized scene vectors with the transformed binarized reference vector, in that the Hamming distances between the transformed, binarized scene vectors and the transformed, binarized reference vector are determined as a measure of the correspondence, and the transformed, binarized scene vector is determined which has the highest correspondence with the transformed, binarized reference vector; and the object to be recognized is classified as having been recognized in the scene if the degree of the correspondence of the transformed, binarized scene vector having the highest correspondence with the transformed, binarized reference vector exceeds a predefined threshold value.

The method according to the invention has the special situation that a modified census transform, combined with a determination of maximum and a threshold setting, is carried out as a special, simplified correlation method, with the aid of which the electronic image of the scene is checked for the presence of the object for the purpose of object recognition. This permits a simplified binarized comparison, by means of which the invention may be implemented with significantly less effort and lower costs compared to the prior art, and results having an extremely faster image frequency may be supplied, so that an object recognition in real time is possible. The method according to the invention is also very well suited for implementation in an electronic circuit, e.g., in a field programmable gate array (FPGA).

The algorithm of a method according to the invention for carrying out a pattern comparison or for recognizing an object in a scene comprises the modified census transform of a pattern (of the object to be recognized) trained in the learning phase and of the captured image of the scene, combined with a binarization of the transformed object and the transformed scene, and a subsequent binary comparison (exclusive or) with the calculation of the Hamming distance as a measure of the correspondence between the trained pattern and the captured image.

In a consensus transform, the surroundings of the pixels is investigated for each pixel in an image window, and the pixel is transformed with the inclusion of these surroundings data. These are very often the eight pixels around a central pixels of 3×3 surroundings. Each of the eight pixels is compared with the central pixel. If the value of the pixel is greater than or equal to the value of the central pixel, a binary 1 is obtained for the pixel as the output of the census transform; otherwise a 0 is obtained. In a census transform, the brightness of different pixels is therefore compared in each case with a central pixel in an image window. A binary value is formed from the particular comparisons with the central pixel for each comparison, a census vector being formed from all binary values, which describes the binarized relative brightness or grayscale value distribution in the image window. In a correlation method, the generated census vectors, for example, may then be compared with each other to locate the same object as reliably as possible in the camera image and the reference image.

In the modified census transform (e.g., cf. Bernhard Fröba, Andreas Ernst; *Face Detection with the Modified Census Transform*, in: Proceedings of the Sixth IEEE International Conference on Automatic Face and Gesture Recognition (FGR'04) 2004), the mean value of all pixels in the observed surroundings is used instead of the central pixel as the comparison value. In 3×3 surroundings, these are thus nine pixels from which the mean value is calculated. In the modified census transform in the 3×3 surroundings, nine 1-bit values are therefore obtained as the result, while in the classic census transform, this number is only 8.

In the classic modified census transform, a binary 1 is obtained as the output for the pixel if the value of the pixel is greater than or equal to the mean value of all pixels in the observed surroundings; otherwise, a 0 is obtained. In a method according to the invention, it only matters in the modified census transform that the value of a pixel is set to 1 if it is greater than the mean value and is set to 0 if it is less than the mean value. The case that the pixel is equal to the mean value may be handed in two alternative ways. The method may be carried out in such a way that the value of a pixel is set to 1 if it is greater than or equal to the mean value and is set to 0 if it is less than the mean value, or the method may be carried out in such a way that the value of a pixel is set to 1 if it is greater than the mean value and is set to 0 if it is less than or equal to the mean value.

It is thus possible to describe a grayscale pattern n×m in size with the aid of the modified census transformation. This is done by comparing each of the n×m pixels with the mean value formed from n×m pixels and by storing the binary result of this comparison in a result vector n×m bits in size. One important advantage for the method according to the invention is that the result vector is independent with respect to a linear transformation of the input pixels, i.e., it is independent of the contrast and brightness offset of the image data.

Due to the modified census transform, a vector having only n×m bits results from n×m pixels of the source pattern, which has a typical 8 or 10 bit grayscale resolution in each case, i.e., from a pattern having n×m×8 or n×m×10 bits. This corresponds to a data reduction by a factor of 8 to 10. Nevertheless, essential properties of the source pattern are retained during the transformation, which are also still independent with respect to a linear transformation. If one wishes to check two patterns for their similarity, it is sufficient to compare the bit vectors of the two patterns in a binary manner after the modified census transform (via bit-by-bit XOR or EQUIV) and to count the number of corresponding or different bits, which is referred to as the Hamming distance.

The method according to the invention is thus particularly simple and may very easily be implemented on logic circuits, such as CPLDs, FPGAs, standard cell arrays, and full custom ICs. The memory demand for a transformed, binarized reference vector of a reference image is also comparatively low at n×m bits.

A further advantage of the invention is that objects may be recognized even if they are not fully present in the image of the scene. This often occurs in practice, for example, when an object is placed at the edge of the image or is partially covered or concealed by another object. Since a complete correspondence is not sought in the method according to the invention, but only the maximum correspondence, objects may also be recognized based on a portion of the complete object, i.e., the recognition may already take place on portions of the complete pattern. It has been shown in practice that objects may be recognized even if up to 10% thereof is not visible in the image of the scene.

The reference image of the object to be recognized may be captured with the aid of an optical sensor during the learning phase. The optical sensor may advantageously be the same one used to capture the scene checked for the presence of the object during the working phase. The optical sensor for capturing the reference image or the scene is preferably an image capturing device, which supplies digital grayscale images, for example a CCD or a CMOS sensor, a camera module, a board camera, a case-mounted camera, or a digital camera.

To record the object to be recognized during the learning phase, the optical sensor or the object to be trained is first positioned in such a way that the object to be trained is in the image of the optical sensor. The image section and the zoom size may then be adapted in such a way that the object to be trained fully fills the image. The object is then selected for training and stored as a reference. If multiple objects are to be trained, for example for later sorting tasks during the working phase, this training is carried out separately for each object. The captured scenes are then compared with the reference object or the reference objects during the working phase, for example in the case of checking or sorting tasks.

Also, the reference image of the object to be recognized may be theoretically calculated during the learning phase, or the reference image of the object to be recognized or the transformed, binarized reference vector may be read in from a database. If the reference image is not read in with the aid of the optical sensor, but is theoretically calculated from properties of the object, for example its shape or contour, or if the reference image or the transformed, binarized reference vector is provided from a database, for example from an earlier capture with the aid of an optical sensor or an earlier theoretical calculation, the method according to the invention may very quickly and easily switch between different recognition tasks (e.g., the presence or the position of a changed object to be recognized) without an image of the recognizing object having to be captured in each case with the aid of the optical sensor.

A reference image of multiple objects to be recognized can be transformed and binarized in each case during the learning phase with the aid of a modified census transform, and the results of these transformations are each stored in transformed, binarized reference vectors, and the results of the scene transformation are consecutively compared with the transformed, binarized reference vectors as transformed, binarized scene vectors during the working phase for the purpose of recognizing the multiple objects to be recognized in the scene. A further advantage of the method according to the invention is that multiple objects to be recognized may also be very easily recognized in this way, and the associated patterns may be compared. The reference images are captured with the aid of an optical sensor during the learning phase, and the transformed, binarized reference vectors are formed therefrom and stored, or the reference images of the object to be recognized are theoretically calculated, or the reference images of the objects to be recognized or the transformed, binarized reference vectors are read in from a database.

An advantageous modification of this example may be that a reference image of multiple objects to be recognized is transformed and binarized in each case during the learning phase with the aid of a modified census transform, and the results of these transformations are each stored in transformed, binarized reference vectors, and the results of the scene transformation are compared in parallel with the transformed, binarized reference vectors as transformed, binarized scene vectors during the working phase for the purpose of simultaneously recognizing the multiple objects to be recognized in the scene. A further advantage of the method according to the invention is that multiple objects to be recognized may also be very easily recognized in this way, and the associated patterns may be simultaneously compared. The reference images are captured with the aid of an optical sensor during the learning phase, and the transformed, binarized reference vectors are formed therefrom and stored, or the reference images of the object to be recognized are theoretically calculated, or the reference images of the objects to be recognized or the transformed, binarized reference vectors are read in from a database.

In both cases, a newly captured image of a scene needs to be processed with the aid of the modified census transform only once, even if multiple different objects are to be sought therein, and the comparison with the reference images then takes place without a great deal of storage effort either consecutively or in parallel for all reference images at the same time. This is a great advantage over methods according to the prior art, such as the normalized cross-correlation (NCC), in which a pixel-to-pixel comparison (scalar product of the grayscale values of the image and pattern) must be carried out with the corresponding computational effort. Instead of a multiplication of, for example, two 8-bit values according to the prior art, the invention requires only one 1-bit comparison (XOR), and instead of the summation of the results with perhaps 20 or more bits, only the determination of the Hamming distance is needed.

These two examples may be used not only to recognize differently shaped objects consecutively or simultaneously, but also to recognize an object which is rotated or scaled (enlarged or decreased in size). Although the method according to the invention is able to recognize an object independently of its position in the image of the scene, it is not designed to tolerate larger rotations or scalings of the object. If such rotations and/or scalings are to be taken into account when recognizing an object, reference images of the object may be captured in different scalings and rotational positions during the learning phase, or they may be synthetically calculated from a capture (or theoretically calculated, or the reference images of the object to be recognized or the transformed, binarized reference vectors may be read in from a database), and the modified census transform of these different versions of the same object may be stored as multiple transformed, binarized reference vectors, which are sought consecutively or simultaneously in the scene during the working phase. The comparison may then take place consecutively or even in parallel—preferably in an integrated circuit or FPGA—in exactly the same way as for different objects, and not only the presence and the position of the object are determined by the search for the highest correspondence, but also its rotational position and/or scaling.

In the practical use of the invention, it may be advantageous to carry out one or multiple of the following steps in combination for the purpose of reducing the memory demand, reducing the circuit complexity, reducing the computational effort, accelerating the object recognition, or implementing the invention with the aid of particular hardware. The explained methods for reducing the image data may be combined in any way and be carried out in any order. A data reduction during the formation of the transformed, binarized reference vectors is advantageously carried out in the same way as when forming the transformed, binarized scene vectors, i.e., the reference image and the image of the scene are reduced in the same way to obtain comparable vectors.

A first advantageous example may be that the image of the scene captured by the optical sensor is not fully checked for the presence of the object in one step, but instead this is done with the aid of a search window which includes an image section of the scene in each case and which is guided over the image of the scene in such a way that the search window passes over the image of the scene, one search window in each case being sequentially checked for the presence of the object with the aid of transformed, binarized scene vectors. A sliding mean value of the pixels may be determined in the search window, and the storage of the image data is necessary only for the number of rows corresponding to the vertical extension of the search window for calculating the sliding mean value as well as for the modified census transform. The size of a search window may advantageously be between 8×8 and 128×128 pixels, preferably 48×48 pixels. This makes it large enough for the reference image of the object to be recognized or the object to be recognized to be completely contained therein, even if the object is a complex or elongated one.

A second advantageous example may be that the number of pixels in the image of the scene captured by the optical sensor is reduced before the transformed, binarized scene vectors are formed. In practice, it is often necessary to reduce the image of the optical sensor (e.g., of a CMOS sensor) for use in the method according to the invention. This is due to the fact that conventional, commercially available CMOS sensors are not available below a certain minimum resolution. Optical sensors having a VGA resolution (640×480 pixels) are very common, there being a clear tendency toward higher resolutions (1280×800 pixels or more). Without reducing the image data, the large number of pixels results in a high computational effort during processing, in particular in light of the fact that image rates of more than 100 images per second are desirable for use in factory automation. For this reason, the number of pixels in the image of the scene captured by the optical sensor may be reduced in one of the first processing steps. This may be done in different ways, which may be carried out individually or in combination.

A first variant is that a partial image (a so-called "region of interest") is selected from the image of the scene captured by the optical sensor. Only the partial image is then checked for the presence of the object, while the other portions of the scene are ignored. A partial image may be selected, for example, by setting a window or by "cropping."

A second variant is that the resolution of the image of the scene captured by the optical sensor is reduced. This primarily means reducing the physical image resolution, i.e., the number of image elements per length or the pixel density, although the grayscale resolution may also be reduced (e.g., from 16 to 8 bits). Reducing the resolution may preferably take place by a suitable binning (combination of adjacent image elements), for example by summation or averaging adjacent pixels, or by an image pyramid (smoothing and downsampling). According to an additional advantageous feature, the reduction of the resolution may be selected in variably settable steps.

A third variant involves processing the image of the scene captured by the optical sensor by sub-sampling, only individual or some pixels of the image of the scene being read out and processed into transformed, binarized scene vectors, and the others being omitted. Leaving pixels out of the image of the scene, which may also be referred to as "thinning out," so that they may be ignored and not taken into account during the object recognition according to the invention, may have different advantages.

Omitting pixels may achieve a size of the transformed, binarized scene vectors which is especially well suited to a digital processing, for example, in that their word size is matched to that of the hardware used. For example, if the algorithm according to the invention is implemented with the aid of a microprocessor or a digital signal processor (DSP), it is advantageous to use a size during the image processing which is a multiple of the word size of this computer (typically 32 bits). This is advantageous, since the comparison (XOR, Hamming distance) may be efficiently implemented thereby in the hardware. Some microprocessor architectures (e.g., TI TMS320C64xx, ARM NEON) also have special commands, which may also be used to efficiently calculate the Hamming distance. If it is not possible to select the size of the image, image section, or search window in this way, pixels therein may be left out. For example, a method according to the invention was tested, which works with a search window of 9×9=81 pixels. The middle row and the middle column of the search window were omitted for the comparison, so that a significantly easier-to-handle transformed, binarized scene vector of 8×8=64 bits could be successfully used.

If the algorithm according to the invention is implemented in a different way, for example by a complex programmable logic device (CPLD), field programmable gate array (FPGA), application-specific integrated circuit (ASIC), or custom IC, there is generally no limitation to a multiple of a certain word size. However, it is often still sensible to omit pixels. On the one hand, this reduces the necessary memory demand for the comparison vectors, and on the other hand, the circuit complexity or the amount of time required for sequential processing is also reduced. For example, it is necessary only to compare the thinned-out pixels in the window with the mean value of the window.

The selection of the pixels of the image of the scene from which transformed, binarized scene vectors are formed may take place in different ways, for example according to a fixed scheme (e.g., certain rows and columns or certain areas) or according to a random or pseudorandom scheme. Since conventional pseudorandom sequences, however, often have the problem that they are correlated within themselves, the use of a random sequence of physical noise is preferred.

Tests have shown that, to reliably recognize an object, it is often sufficient in practice if between 5% and 50%, preferably between 10% and 40%, particularly preferably between 20% and 30% of the pixels of the image of the scene are read out and processed into transformed, binarized scene vectors, and the other pixels are left out, depending on which scheme is used to select the pixels and how the objects are shaped.

A particularly significant advantage of the invention is that an object recognition may be carried out thereby very quickly and with a very high frequency. In cases in which a particularly high speed is not desired, but rather a particularly high reliability of the object recognition, the method according to the invention may be carried out in two stages. In the first stage, the object is quickly sought and recognized with the aid of a method according to the invention, possibly according to one or multiple of the advantageous further embodiments, for example the number of pixels in the image of the scene captured by the optical sensor being reduced before the transformed, binarized scene vectors are formed. In the second stage, the result found in the first stage is verified, in that a more precise object recognition is additionally carried out in the area of the image of the scene where the object was recognized in the first stage. The more precise object recognition in the second stage may take place, for example, with the aid of a method according to the invention, the number of pixels in the image of the scene captured by the optical sensor not being reduced, or being reduced to a lesser extent than in the first stage, before the transformed, binarized scene vectors are formed, or with the aid of a conventional method known from the prior art for machine vision and image analysis for recognizing an object in an electronic image.

In the first stage, the object is thus quickly and roughly recognized, and in the second stage, this result is checked by a finer or more precise image analysis. If the result of the second stage confirms the one from the first stage, it is accepted as verified; otherwise, the result is discarded. Since the entire image of the scene no longer has to be searched for the object in the second stage, but the result already present from the first stage only has to be checked, the amount of time required for the second stage is very limited, so that the entire method may always run very quickly, and a high accuracy and reliability of the object recognition is still achieved.

A method according to the invention may be advantageously used in the field of machine vision in industrial environments, manufacturing facilities and applications, as were described in the introductory part of this patent application. These include, in particular, recognizing the presence of an object (pattern), i.e., for example, a distinction between whether an object is present or not present, or a qualitative statement about a scene, such as good/bad or correct/false, recognizing the position of an object (e.g., for bonders, insertion machines, and gluing processes), recognizing the rotational position of an object, or carrying out pattern comparisons (e.g., to choose an object from among many, for example for sorting tasks).

A system according to the invention or an apparatus according to the invention for recognizing an object in an electronic image of a scene, comprising an optical sensor for capturing an electronic image of a scene and a digital data processing unit for processing image data, is characterized in that the system or the apparatus is designed to carry out a method according to one of the preceding claims.

An apparatus according to the invention may be, in particular, an image processing sensor, which comprises an optical sensor for capturing an electronic image of a scene and a digital data processing unit for processing image data according to the method according to the invention, combined in an integrated manner on a circuit board. The digital data processing unit may preferably comprise an FPGA module, a processor, a memory, and a peripheral interface.

The method according to the invention may be modified in different ways. These modifications include, for example, the following (instead of a modified census transform and a comparison):

A first modification is that the object in the image of the scene is not looked for by comparison with binarized vectors transformed with the aid of the modified census transform, but rather with the aid of an absolute different correlation (ADC). In this alternative correlation method, the grayscale values are subtracted from the image of the scene and the object (pattern) in the search window, and the absolute value of the difference is added up as a degree of error. The method naturally works with any norm, e.g., also with the Euclidean norm.

A second modification is that the object in the image of the scene is not looked for by the comparison with the binarized vectors transformed with the aid of the modified census transform but rather with the aid of a normalized correlation function (NCF). In this alternative correlation method, a brightness and contrast normalization takes place for the search window in the image of the scene as well as for the object (pattern). The normalization of the object (pattern) may already take place in the learning phase; the normalization for the search window takes place with the aid of a telescope method, i.e., using a sliding mean value in a search window.

A third modification is that, during a sub-sampling of the image of the scene, the pixels of the image of the scene, from which transformed, binarized scene vectors are formed, are selected horizontally along an object contour. This takes into account the fact that image areas of a constant image brightness on the whole contain little information. Instead, the information content is in image areas of greater variation, i.e., in the contours. These are distinctive for a particular object. This eliminates the need to compare pixels, which contribute little to the description of the object in any case. The disadvantage of the method is that, in the case of multiple comparison patterns, the union of all contour pixels must be compared for each object used, since the formation of maximum does not otherwise work. This may quickly result in this strategy becoming inefficient.

A fourth modification may be as follows. In the method according to the invention, the objects (patterns) to be searched for or the object (partner) to be searched for is/are trained once and no longer changed for a search task. However, if a continuous update of the search pattern or the search patterns is permitted, which is usually possible in a hardware implementation by simply changing the control program on the microprocessor, the method according to the invention may be used not only to determine the presence, position, and site of an object, but also to measure the movement and speed. This may be used for the contactless speed and position measurement of industrial processes, e.g., of conveyor belts, in handling processes, and in robotics. It may also be used as a motion meter for drones if the problematic coupling of the degree of X/Y and angular freedom is sufficiently solved. The use of an optical computer mouse is also possible. Since it is easily possible to compare multiple patterns in parallel, it is possible with the aid of this method to measure not only a linear movement in the X and Y directions but also a rotation.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows a census transform of a search window;

FIG. 3 shows a modified census transform of a search window;

DETAILED DESCRIPTION

Figure 1:
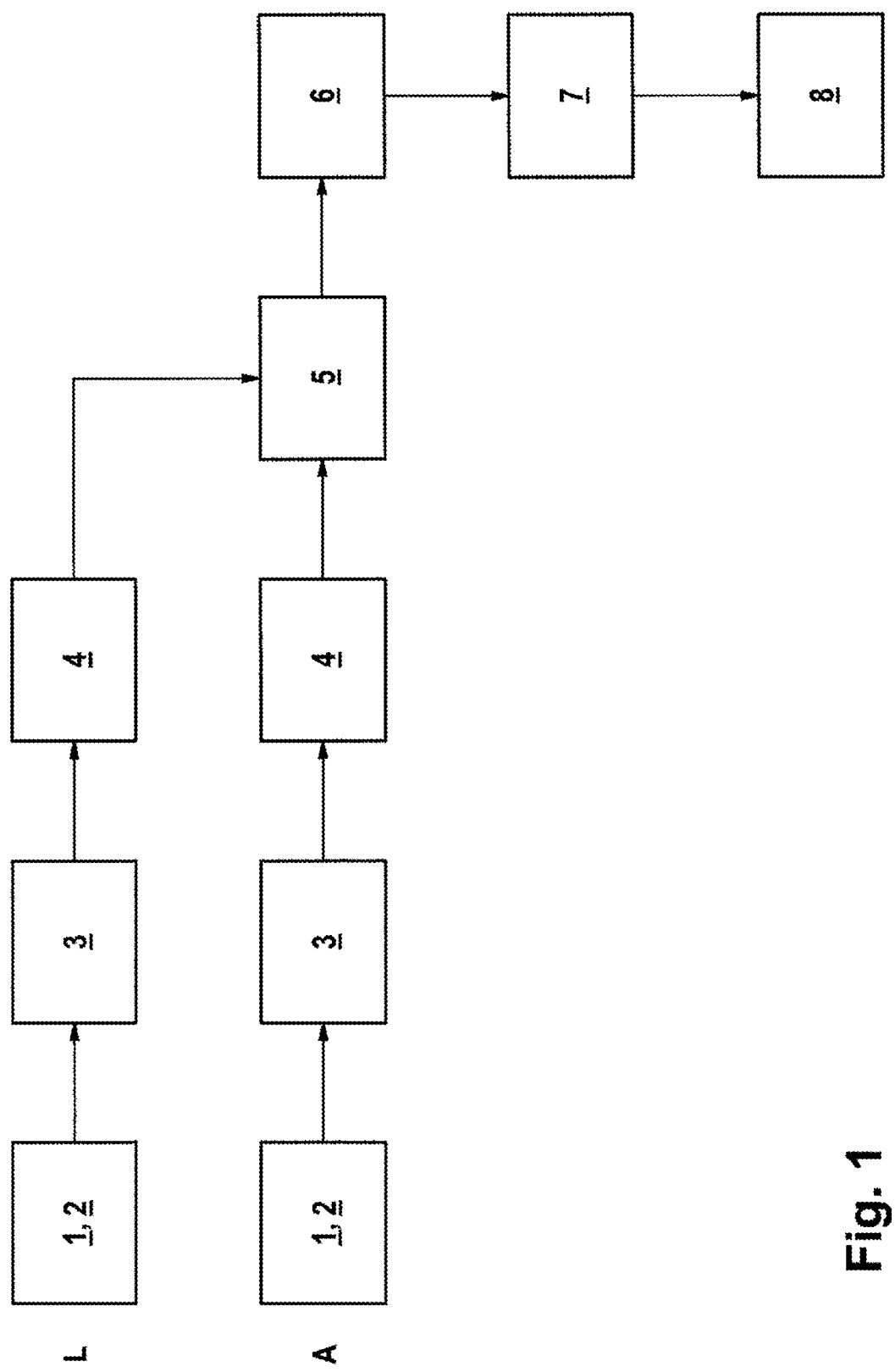
FIG. 1 shows a simplified diagram of a method according to the invention.

FIG. 1 illustrates the principle sequence of a method according to the invention for recognizing a pattern in the case that the reference image of the object to be recognized is captured with the aid of an optical sensor 1 in learning phase L. Learning phase L is shown in the upper portion of FIG. 1. A recording 2 of a reference image of the object to be recognized later on in a scene is captured with the aid of an optical sensor 1. An object of this type may be an arbitrary object, which is identified, in particular, by its shape, contour, size, or rotational position, but which may also be rendered more individual by other parameters (surface condition, writing, etc.) An output image has, for example, 1280×800 pixels. This is followed by a preprocessing 3 of the image data, which may comprise, in particular, the setting of a search window or the data reduction by selecting a partial image, reducing the resolution, for example by binning or an image pyramid, or sub-sampling, for example by using a fixed scheme, a random or pseudorandom scheme, or physical noise. The image size is reduced thereby, for example to 128×128 pixels.

Preprocessing 3 is followed by the feature reduction with the aid of a modified census transform 4, and the result of this transformation is stored in a transformed, binarized reference vector. Learning phase L is carried out once for an object to be recognized. Learning phase L is carried out once for each of multiple, different objects. In alternative specific embodiments, the reference image of the object to be recognized may be theoretically calculated during learning phase L, or the reference image of the object to be recognized or the transformed, binarized reference vector may be read in from a database.

Working phase A is shown in the lower portion of FIG. 1. A recording 2 of a scene, which is checked for the presence of the object to be recognized, trained during learning phase L, is generated, similarly to learning phase L, with the aid of an optical sensor 1. An output image has, for example, 1920×1080 or 1280×800 pixels at an image refresh rate of 100 Hz. These numbers make it clear that this is a demanding task to reliably check this large data stream for the presence of one or multiple patterns by means of a pattern comparison in real time. Recording 2 is followed, in turn, by a preprocessing 3 of the image data, which may comprise, in particular, the setting of a search window or data reduction by selecting a partial image, reducing the resolution, for example by binning or an image pyramid, or sub-sampling, for example by using a fixed scheme, a random or pseudo-random scheme, or physical noise. The image may also be enlarged or reduced in size (zoom function) according to the settings selected by the user. The image size is reduced by preprocessing 3, for example, to 48×48 or 128×128 pixels. This is followed by the feature reduction with the aid of a modified census transform 4, and the results of this scene transformation are stored as transformed, binarized scene vectors and processed.

In working phase A, the classification with statement 8 also takes place based on a pattern comparison 5 in which the transformed, binarized scene vectors are compared with the transformed, binarized reference vector, the Hamming distances, i.e., the number of corresponding bits between the transformed, binarized scene vectors and the transformed, binarized reference vector are determined as a measure of the correspondence, and the transformed, binarized scene vector having the highest correspondence with the transformed, binarized reference vector is determined in a determination of maximum 6. A threshold value 7 is used to recognize an object with a high degree of accuracy. Images, in which the threshold value is not reached, are assumed to not contain the object. The setting of threshold value 7 thus determines the degree of correlation between the object and the scene required for a positive statement 8. The object to be recognized is classified as having been recognized in the scene, or an affirmative statement 8 is made if the degree of correspondence between the transformed, binarized scene vector which has the highest correspondence with the transformed, binarized reference vector exceeds predefined threshold value 7.

To summarize in simplified terms, the invention relates to a method for machine vision and image analysis for recognizing an object in an electronic image, which is captured with the aid of an optical sensor 1. It is proposed to train a reference image of the object to be recognized in a learning phase L and to compare it with the image of the scene in a working phase A, pattern comparison 5 between the object and the scene taking place with the aid of a modified census transform 4, using determination of maximum 6, and the degree of correspondence must exceed a threshold value 7 for a positive statement 8. The invention thus relates to the optical capture of objects, an image of a scene being compared with a reference image of the object, and the object being identified in the image with the aid of a correlation method. According to the invention, the correlation method is based on a modified census transform of the object and the image of the scene, the calculation of the Hamming distance of the vectors resulting from the transformation, and a determination of maximum, including a threshold value setting, to identify the object to be recognized in the image of the scene.

If multiple objects are to be recognized simultaneously in recording 2, pattern comparison 5 may be carried out with the aid of a particular maximum search for each object, parallelized between the binarized scene vectors transformed (only once) and the transformed, binarized reference vector belonging to an object in each case. When comparing multiple stored objects with recording 2, a correspondence value for each of the stored objects is determined. This calculation may take place in parallel and simultaneously for all objects. A specific embodiment of this type may be used, for example, when carrying out a sorting tasks if a distinction must be made between multiple objects. In particular pattern comparisons 5, the object having the greatest correspondence to the captured image is output in each case. In this case as well, the correspondence value must be greater than a threshold value in each case so that the object is classified as having been recognized.

If an object is recognized during working phase A, or if multiple objects are recognized, not only can an affirmative statement 8 be made, but the position (x and y values) of the located object in recording 2, i.e., in the image of the scene, may also be output. This position information may be important for the further processing, e.g., for pick-and-place applications of a robot. The same is true if the actual rotational position of an object in a scene is determined by comparison with multiple trained reference images of the object in different rotations.

If statement 8 made during working phase A is to be verified for a recognized object, working phase A may be repeated for this object with the aid of transformed, binarized scene vectors, which belong to the object in the image of the scene and its immediate surroundings. During preprocessing 3 of the image data, no data reduction or only one which is more limited than in first statement 8 may be carried out, so that statement 8 may be checked with a higher accuracy, for example at a higher resolution, and thereby made more reliably by means of the more precise repetition of working phase A in the area of the scene belonging to the located object. If necessary, preprocessing 3 should be adapted for this purpose according to the changed preprocessing of working phase A during preceding learning phase L. The additional checking of a particular recognized area requires only very little additional processing time.

Alternatively, instead of verifying statement 8 on an object recognized during working phase A using a more precise repetition of working phase A for the image area of the scene belonging to the recognized object, this may also be done with the aid of recording 2 or its image data after a preprocessing 3, using a conventional method known from the prior art for machine vision and image analysis fir recognizing an option in an electronic image.

FIG. 2 shows a census transform for an area having 3×3 pixels. Pixels "1", "2", "3" etc. are compared with pixel C, for example in this order.

FIG. 3 shows a modified census transform for an area having 3×3 pixels. Pixels $I_0$, $I_1$ . . . $I_8$ are compared with mean value avg $$avg = \frac{1}{9}\sum_{i=0}^{8} It$$

Figures 4, 5:
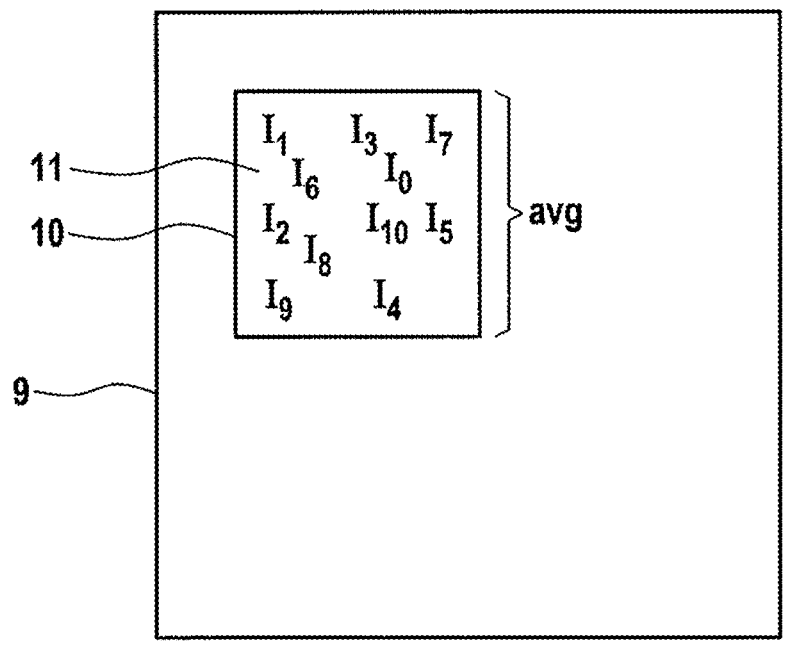
FIG. 4 shows a modified census transform, including a random selection of pixels in the search window.
FIG. 5 shows the application principle of a search window.

FIG. 4 shows a modified census transform in a 48×48 window. Pixels $I_0$, $I_1$ . . . $I_k$, where k≤2303, are compared with mean value avg $$avg = \frac{1}{2304}\sum_{i=0}^{2303} It$$

However, not all pixels are transformed, but only a selection of pixels $I_i$. Pixels $I_i$ are selected with the aid of a physical random sequence, all pixels being transformed, i.e., the complete window is transformed if k=2303 pixels is selected.

FIG. 5 shows the application principle of a search window in the method according to the invention, in which the pattern comparison takes place with the aid of a modified census transform. The image of scene 9 captured by optical sensor 1, which may have been reduced in a preprocessing 3, to a resolution of 128×128 pixels in the illustrated exemplary embodiment, is not checked completely for the presence of the object in one step but rather with the aid of a search window 10. Search window 10 contains in each case an image section 11 of the scene, which in each case has 48×48 pixels in the illustrated exemplary embodiment, and it is guided over the image of scene 9 in such a way that it passes over the image of scene 9, one search window 10 in each case being checked for the presence of the object with the aid of transformed, binarized scene vectors. The transformed. binarized scene vectors are selected randomly in search window 10 according to FIG. 4. Mean value avg is the mean value of all pixels in the 48×48 pixel search window 10, and bits $b_i$ of the scene vector, whose length k 2303 bits, is set to 0 if $I_i$<avg, and is set to 1 if $I_i$≥avg. Alternatively, it is also possible to set bits $b_i$ of the scene vector to 0 if $I_i$ avg, and to 1 if $I_i$>avg, i.e., to handle case $I_i$=avg differently.

Figure 6:
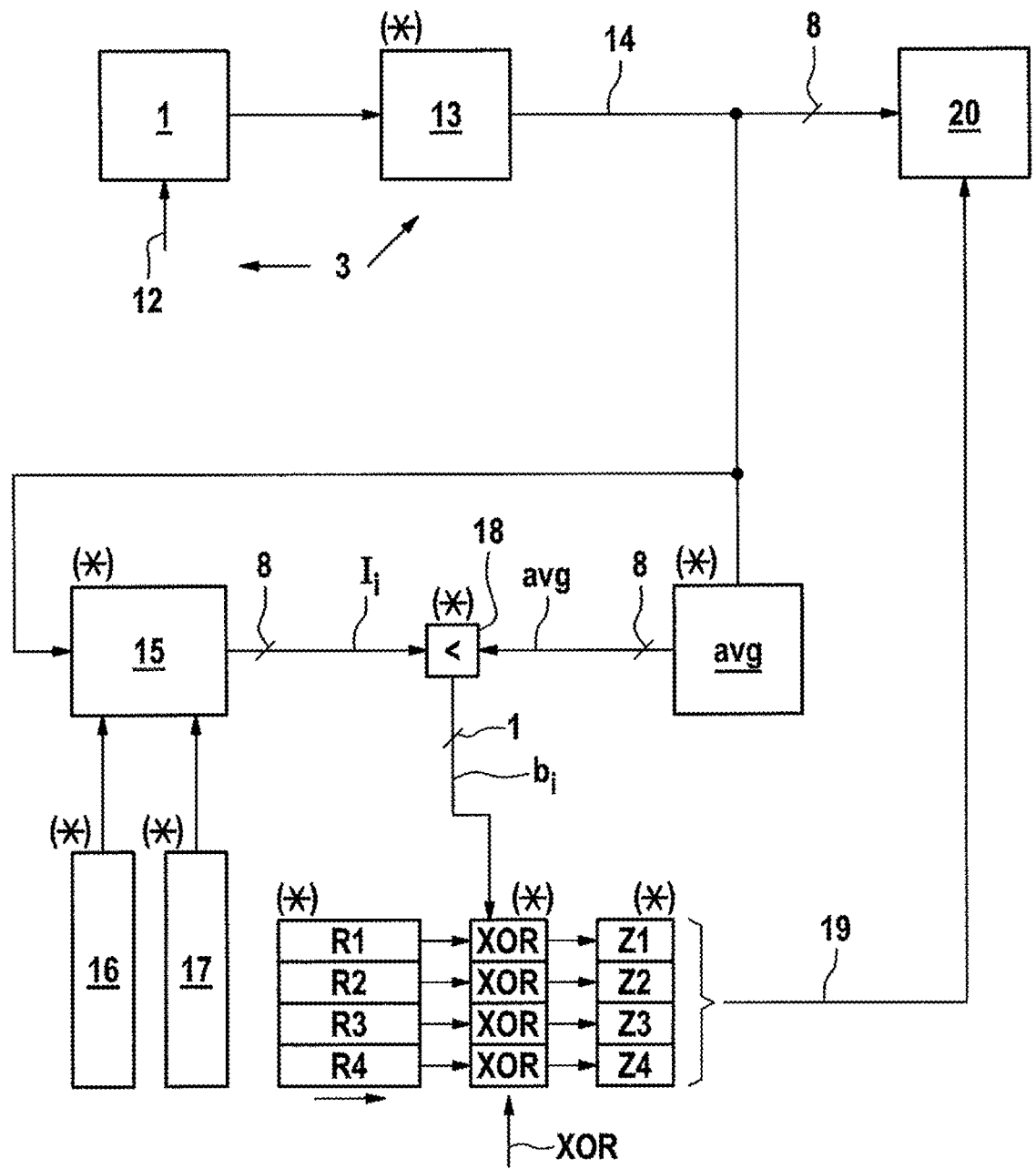
FIG. 6 shows an exemplary embodiment of a hardware implementation of the invention.

FIG. 6 shows an exemplary embodiment of a hardware implementation of the invention. A CMOS sensor having a resolution of 1280×800 pixels and a global shutter is used as optical sensor 1. Its video data are output, for example, as "Mipi CSI2." The image data output by optical sensor 1 are reduced with the aid of a preprocessing 3. Preprocessing 3 comprises two areas, namely the selection 12 of image data on optical sensor 1 itself or the limitation of the image data captured by optical sensor 1, and the reduction 13 of the image data output by optical sensor 1. In the exemplary embodiment, a binning to 640×400 pixels and the selection of a partial image of the scene (region of interest") via "cropping" by controlling the shutter and gain are carried out for the purpose of selection 12. Reduction 13 takes place with the aid of an image pyramid. To make the relationship between the complete image view and the search pattern size variable, it may be provided to select the factor of the image reduction in variably settable steps, e.g. integer increments. In the specific implementation shown, selection 12 takes place directly on the CMOS sensor, and reduction 13 (mean value formation, pyramid) takes place in one stage, which is implemented in the FPGA of the apparatus, as are all function blocks marked (*) in FIG. 6. The resulting grayscale image of video data of reduced image 14 then has a resolution of only 128×128 pixels. In the specific implementation, the search window was implemented with a fixed size of 48×48 pixels.

Sliding mean value avg is first determined in the search window. This is preferably done with the aid of a so-called telescope, i.e., only two additions and two subtractions as well as a normalization are needed for each further result once the mean value for all image windows has been calculated in the top row, because most of the pixels, and also their sum, correspond to the adjacent search windows. This speeds up the calculation of the mean value, since it does not have to be completely recalculated for all pixels taken account therein, but only the changed pixels resulting from the displacement of the search window are taken into account in the sliding calculation.

For calculating the sliding mean value, and also for the modified census transform, the image data need to be stored only for the number of rows corresponding to the vertical extension of the search window. In the specific case, these are 48 rows, each having 128 pixels, which corresponds to a memory demand of 6 Kbytes. This storage takes place in a memory 15, which operates according to the first in/first out (FIFO) principle. Memory 15 is controlled by an input address generator 16 and an output address generator 17 (also possible as a RAM).

Memory 15 was implemented as an "embedded block RAM" in an FPGA, in six EBR blocks of 1 Kbyte each, which are each configured as a dual-port RAM. To calculate the modified census transform, the RAM is addressed sequentially via a described random sequence. Although the position of the selected pixels in the search window is distributed as randomly and uniformly as possible, the sequence is the same for all search windows, which is why it may be stored fixedly in the FPGA, i.e., in a ROM.

For each x-y position of the search window, an address generator generates the random sequence for the RAM, which outputs the corresponding grayscale information for the pixel. The latter is compared with previously calculated sliding mean value avg in pattern comparison stage 18, which supplies one bit of the modified census transform for the search window.

With the aid of an XOR logic comparison, this result bit may be compared with the corresponding bit of a previously stored transformed, binarized reference vector R1, which belongs to the sought object. Reference vector R1 is preferably stored in a shift register. The number of corresponding pixels is counted in a counter Z1. After sufficient (fixed value k) "samples" have been compared, the search window moves one pixel to the right or, in the case of the last pixel, to a row at the beginning (left) of the next row.

FIG. 6 also shows that it is possible with relatively little effort to compare multiple stored objects simultaneously with the aid of the modified census transform of the search window and thus to search for them simultaneously in the search window or the image of the scene. For this purpose, a transformed, binarized reference vector is stored for each object to be checked (R1, R2, R3, and R4 in the exemplary embodiment), and comparison XOR using the search window takes place in parallel and simultaneously, the number of pixels corresponding in each case being stored in a particular counter (Z1, Z2, Z3, and Z4 in the exemplary embodiment). It is also possible to keep the number of random samples k fixed for a specific search task and variable in terms of operation. For example, it is also possible to compare the entire pattern without the image reduction by the random pattern. After k cycles, the number of correspondences for the pattern compared in each case is available in the particular counters.

In the example of a specific implementation, the particular sliding maximum for the counter or correspondence value as well as its position in the x and y directions and the identification of the corresponding object are stored with a subsequent determination of maximum. After processing a complete image, these values or results are valid globally for the entire image and may be read out from a microprocessor via readout 19. It is also possible to read out partial values immediately after being obtained, using the microprocessor, and to implement the determination of maximum via a program. Readout 19 takes place via a DMA channel 20 to the microprocessor, via which the video data for reduced image 14 may also be transmitted.

This type of determination of maximum is also referred to as a "winner takes all" strategy. A threshold value is used to facilitate the recognition of an object with a sufficient accuracy. Images of the scene which do not reach the threshold value are assumed to not contain the object.

Figure 7:
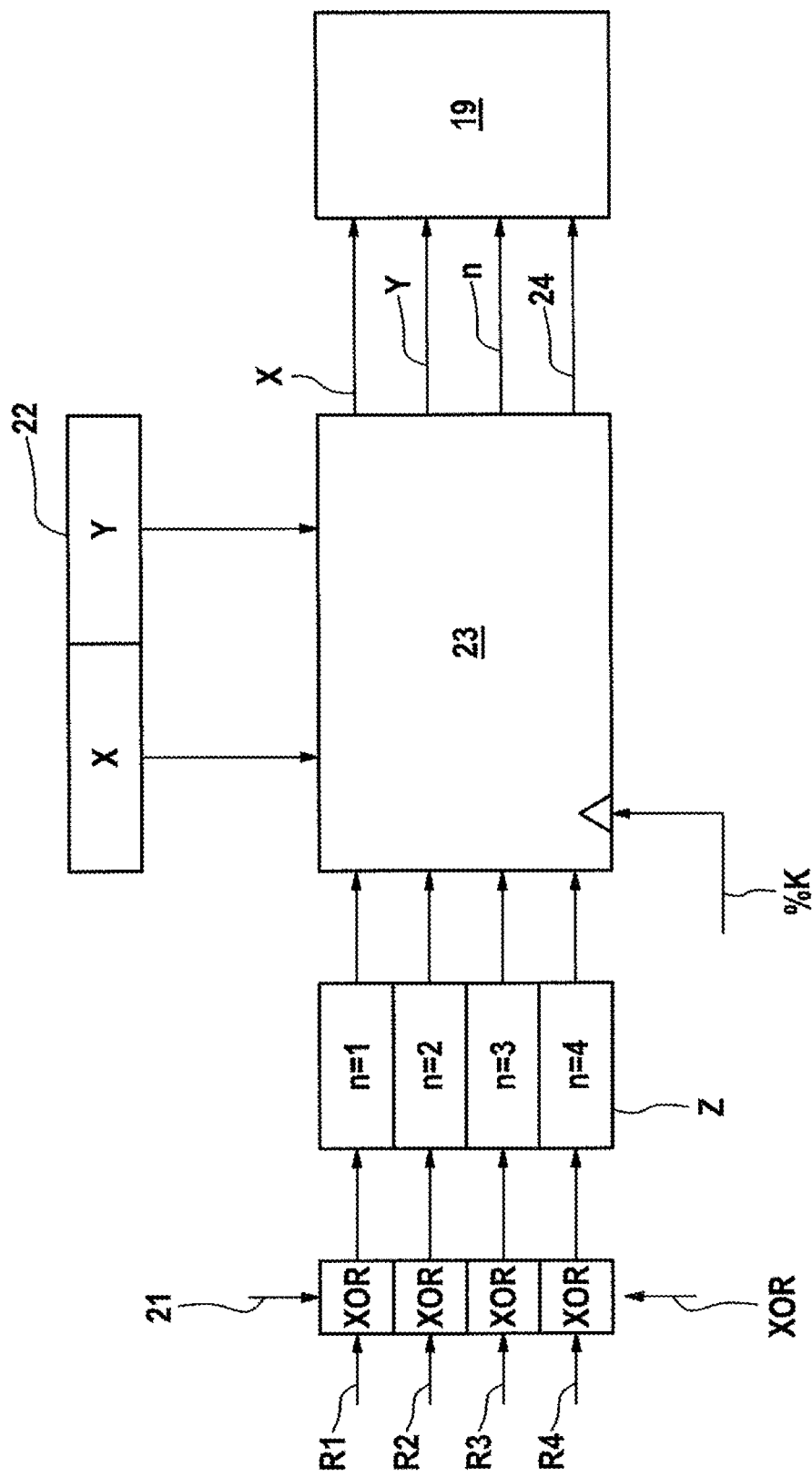
FIG. 7 shows the determination of maximum in detail.

FIG. 7 shows the determination of maximum in detail. In the XOR logic comparisons, current modified census transform values 21 provided by the pattern comparison stage are compared with reference vectors R, and the number of corresponding pixels are counted in particular counter Z. Current image position 22 is provided from the x and y register. In determination of maximum 23, the particular maximum correspondence is determined, and the x position, the y position, identification n of the corresponding object, and counter value 24 for the located maximum are stored. Via readout 19, these values are output once per image to a microprocessor for further evaluation. Alternatively, the determination of maximum may also be carried out in the FPGA instead of in a microprocessor.

Figure 8:
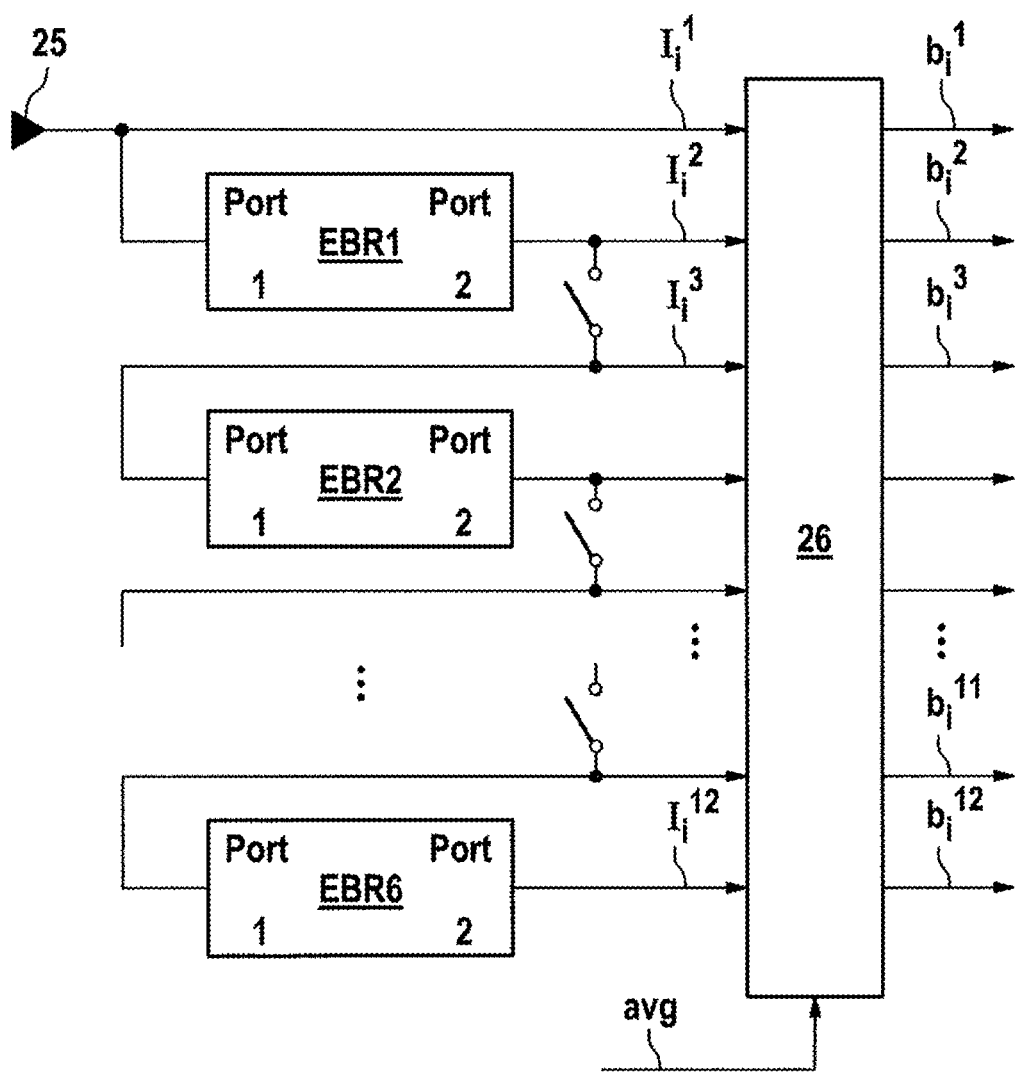
FIG. 8 shows the acceleration of the method with the aid of multiple "embedded block RAMs" (EBRs)

FIG. 8 shows how the method may be accelerated with the aid of multiple "embedded block RAMs" (EBRs). In the specific implementation, an additional acceleration is achieved in that each of the EBRs used (a total of six block RAMs) may be read out in parallel, using two ports in each case, by which a parallelization and speed increase by a factor of 12 are possible. 6144 bytes of buffer memory are needed for storing 48 rows of 128 pixels each (made up of 8 bits each). The FPGA used provides EBR memories of 1024 bytes each. The EBRs may be configured as dual-port RAMs. Pixel input 25 is compared with comparison value avg, parallelized with the aid of the six EBRs and twelve comparators 26. In this way, twelve comparisons may be carried out simultaneously in each cycle, which means an acceleration by a factor of twelve. Only one cycle per processing step must be reserved for the input and further displacement of new pixels.

Figure 9:
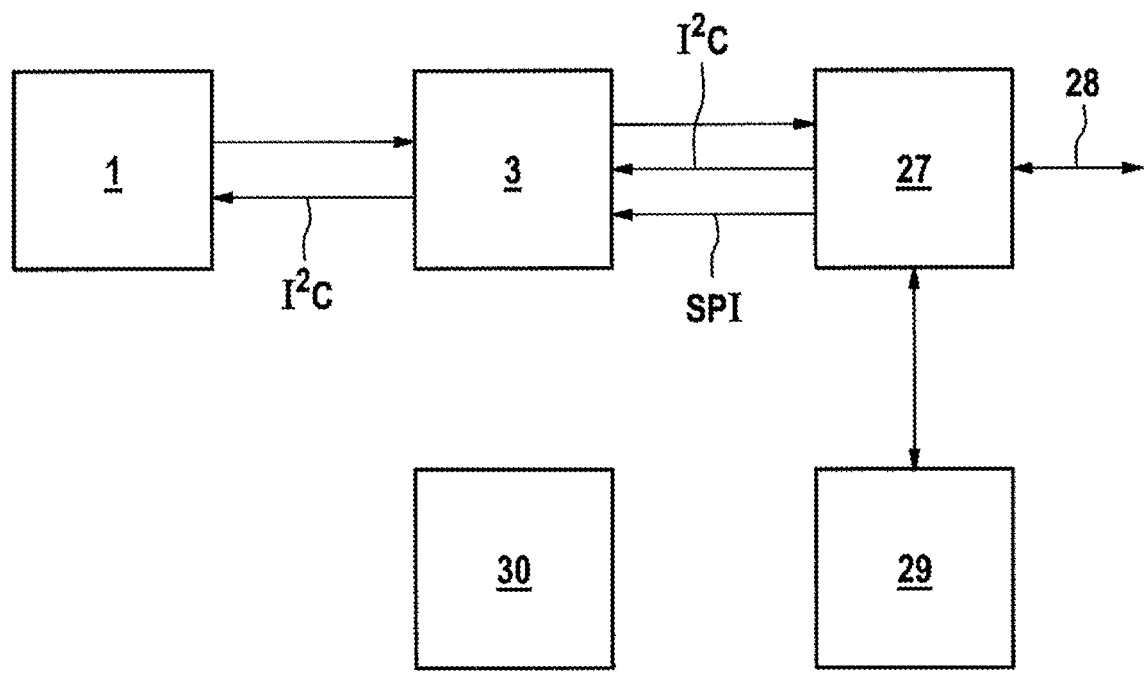
FIG. 9 shows an example of a schematic diagram of components of a system according to the invention.

FIG. 9 shows an example of a schematic diagram of components of a system according to the invention. Optical sensor 1 has, for example, a resolution of 1280×800 pixels. Preprocessing 3 of the image data takes place with the aid of an FPGA, for example using an image pyramid or by controlling binning and cropping of optical sensor 1. The video data of optical sensor 1 are transmitted via two Mipi CSI2 lanes to the FPGA, which controls the optical sensor via an I²C interface. The reduced video data are transmitted from the FPGA in parallel to a microprocessor 27 or a microcontroller having a data memory (RAM), a program memory (QSPI), and a DMA. The microprocessor controls the FGPA via an I²C and an SPI interface. Various peripheral interfaces 28 (e.g., Ethernet, LAN, I²C, SPI, serial, IO-Link, Profinet) may facilitate the communication between the microprocessor and the periphery. A display and operating unit 29 is optionally provided. A power supply 30 may be used as a power sequencer for monitoring and for resetting.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for machine vision and image analysis for recognizing an object in an electronic image, in which a scene is captured with the aid of an optical sensor and an electronic image of the scene is generated, and the electronic image of the scene is checked for the presence of the object with the aid of a correlation method, in that the electronic image of the scene is compared with a reference image of the object using the correlation method, the method comprising:

transforming, in a learning phase, a reference image of the object to be recognized via a modified census transform and binarizing the reference image, in that pixels of the transformed reference image are compared with a mean value of the transformed reference image formed from these pixels, and the value of a pixel is set to 1 if it is greater than the mean value and is set to 0 if it is less than the mean value; and storing the result of the transformation in a transformed, binarized reference vector;

capturing, in a working phase, an image of a scene via an optical sensor that is to be checked for a presence of the object to be recognized;

transforming the image of the scene or image sections of the image via a modified census transform and binarizing such that pixels of the transformed image or image section are compared with the mean value of the transformed image or image section formed from these pixels, the value of a pixel being set to 1 if it is greater than the mean value and being set to 0 if it is less than the mean value; and comparing the results of this scene transformation as transformed, binarized scene vectors with the transformed binarized reference vector, in that Hamming distances between the transformed, binarized scene vectors and the transformed, binarized reference vector are determined as a measure of the correspondence, and the transformed, binarized scene vector is determined which has the highest correspondence with the transformed, binarized reference vector; and classifying the object to be recognized as having been recognized in the scene if the degree of the correspondence of the transformed, binarized scene vector having the highest correspondence with the transformed, binarized reference vector exceeds a predefined threshold value.

2. The method according to claim 1, wherein the reference image of the object to be recognized is captured with the aid of an optical sensor during the learning phase.

3. The method according to claim 1, wherein the reference image of the object to be recognized is theoretically calculated during the learning phase, or wherein the reference image of the object to be recognized or the transformed, binarized reference vector is read in from a database.

4. The method according to claim 1, wherein a reference image of multiple objects to be recognized is transformed in each case with the aid of a modified census transformation and binarized during the learning phase, and the results of these transformations are each stored in transformed, binarized reference vectors, and the results of the scene transformation are consecutively compared as transformed, binarized scene vectors with the transformed, binarized reference vectors during the working phase to recognize the multiple objects to be recognized in the scene.

5. The method according to claim 1, wherein a reference image of multiple objects to be recognized is transformed in each case with the aid of a modified census transform and binarized during the learning phase, and the results of these transformations are each stored in transformed, binarized reference vectors, and the results of the scene transformation are compared as transformed, binarized scene vectors in parallel with the transformed, binarized reference vectors during the working phase for the purpose of simultaneously recognizing the multiple objects to be recognized in the scene.

6. The method according to claim 1, wherein the image of the scene captured by the optical sensor is not completely checked for the presence of the object in one step but rather with the aid of a search window, which contains an image section of the scene in each case and is guided over the image of the scene such that the search window passes over the image of the scene, and wherein the search window is checked sequentially in each case for the presence of the object with the aid of transformed, binarized scene vectors.

7. The method according to claim 6, wherein the search window has a size between 8×8 and 128×128 pixels or has a size of 48×48 pixels.

8. The method according to claim 6, wherein the search window is large enough that the reference image of the object to be recognized or the object to be recognized is completely contained therein.

9. The method according to claim 1, wherein the number of the pixels in the image of the scene captured by the optical sensor is reduced before the transformed, binarized scene vectors are formed.

10. The method according to claim 9, wherein a partial image is selected from the image of the scene captured by the optical sensor, and wherein only the partial image is checked for the presence of the object, and the other portions of the scene are ignored.

11. The method according to claim 9, wherein the resolution of the image of the scene captured by the optical sensor is reduced.

12. The method according to claim 11, wherein the resolution of the image of the scene captured by the optical sensor is reduced by a binning or an image pyramid.

13. The method according to claim 9, wherein the image of the scene captured by the optical sensor is processed by means of sub-sampling, and wherein only individual or some pixels of the image of the scene are read out and processed into transformed, binarized scene vectors, and the others are left out.

14. The method according to claim 13, wherein the pixels of the image of the scene from which transformed, binarized scene vectors are formed are selected according to a fixed scheme or according to a random or pseudorandom scheme using a random sequence of physical noise.

15. The method according to claim 13, wherein between 5% and 50%, or between 10% and 40%, or between 20% and 30% of the pixels of the image of the scene are read out and processed into transformed, binarized scene vectors, and the other pixels are left out.

16. The method according to claim 1, wherein the method is carried out in two stages, the object being rapidly sought and recognized in the first stage, using the method according to claim 1, and the result found in the first stage being verified in the second stage, in that a more precise object recognition is carried out in the area of the image of the scene in which the object was recognized in the first stage.

17. The method according to claim 16, wherein the method is carried out in the first stage using the number of the pixels in the image of the scene captured by the optical sensor and is reduced before the transformed, binarized scene vectors are formed, and wherein the more precise object recognition takes place in the second stage in that the number of pixels in the image of the scene captured by the optical sensor are not being reduced, or only to a lesser extent than in the first stage, before the transformed, binarized scene vectors are formed.

18. A computer program product or a computer-readable digital memory medium, including stored computer-readable, computer-executable instructions for carrying out the method according to claim 1, including instructions which, when loaded and executed in a processor, a computer, or a computer network, induce the processor, the computer, or the computer network to carry out the method steps.

19. A system or apparatus for recognizing an object in an electronic image of a scene, comprising an optical sensor for capturing an electronic image of a scene and a digital data processing unit for processing image data, wherein the system or the apparatus is configured to carry out the method according to claim 1.

20. The apparatus according to claim 19, wherein the apparatus is an image processing sensor, which comprises and optical sensor for capturing an electronic image of a scene and a digital data processing unit for processing image data, combined in an integrated manner on a circuit board.

21. The apparatus according to claim 20, wherein the digital data processing unit comprises an FPGA module, a processor, a memory, and a peripheral interface.

* * * * *